(12) United States Patent
Watson et al.

(10) Patent No.: US 8,290,871 B1
(45) Date of Patent: *Oct. 16, 2012

(54) SYSTEMS AND METHODS FOR A SECURE RECORDING ENVIRONMENT

(75) Inventors: Joe Watson, Alpharetta, GA (US); Marc Calahan, Woodstock, GA (US); Jamie Richard Williams, Fleet (GB); Thomas Z. Dong, Marietta, GA (US); Damian Smith, Epsom (GB)

(73) Assignee: Verint Americas, Inc., Roswell, GA (US)

( * ) Notice: Subject to any disclaimer, the term of this patent is extended or adjusted under 35 U.S.C. 154(b) by 34 days.

This patent is subject to a terminal disclaimer.

(21) Appl. No.: 12/769,541

(22) Filed: Apr. 28, 2010

Related U.S. Application Data

(63) Continuation of application No. 11/479,926, filed on Jun. 30, 2006, now Pat. No. 7,769,176.

(51) Int. Cl.
*G06F 21/00* (2006.01)
*H04L 9/32* (2006.01)

(52) U.S. Cl. ............ 705/50; 705/67; 705/901; 705/902; 705/908; 726/2; 726/26; 726/27; 713/189; 713/193; 380/277

(58) Field of Classification Search ................ 726/2, 26, 726/27; 380/277; 713/193, 189; 705/67, 705/901, 902, 908, 50
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |

(Continued)

FOREIGN PATENT DOCUMENTS

EP 0453128 A2 10/1991

(Continued)

OTHER PUBLICATIONS

"Customer Spotlight: Navistar International," Web page, unverified print date of Apr. 1, 2002.

(Continued)

*Primary Examiner* — Philip Chea
*Assistant Examiner* — Shanto M Abedin
(74) *Attorney, Agent, or Firm* — McKeon, Meunier, Carlin & Curfman

(57) ABSTRACT

Systems and methods are disclosed for providing secure, captured data in a customer center. In one embodiment, the method comprises: capturing data with a recording system; receiving a request to retrieve electronic keys for encrypting the data; responsive to receiving the request, transmitting the electronic keys to the recording system; encrypting the data using the electronic keys; associating the electronic keys with the encrypted data; and storing the encrypted data in the recording system.

12 Claims, 10 Drawing Sheets

U.S. PATENT DOCUMENTS

| | | | |
|---|---|---|---|
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia, Jr. et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,109 A | 12/2000 | Schiferl et al. |
| 6,157,808 A | 12/2000 | Hollingsworth |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,398,245 B1 * | 6/2002 | Gruse et al. ................. 280/228 |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,523,113 B1 | 2/2003 | Wehrenberg |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,574,609 B1 | 6/2003 | Downs et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,912,513 B1 | 6/2005 | Candelore |
| 6,954,854 B1 | 10/2005 | Miura et al. |
| 6,959,078 B1 | 10/2005 | Eilbacher et al. |
| 6,965,886 B2 | 11/2005 | Govrin et al. |
| 6,981,138 B2 | 12/2005 | Douceur et al. |
| 6,986,030 B2 | 1/2006 | Shmueli et al. |
| 7,047,422 B2 * | 5/2006 | Benaloh ....................... 713/193 |
| 7,111,005 B1 | 9/2006 | Wessman |
| 7,124,304 B2 | 10/2006 | Bel et al. |
| 7,130,426 B1 | 10/2006 | Cha et al. |
| 7,242,771 B2 | 7/2007 | Shiragami et al. |
| 7,266,691 B1 | 9/2007 | Ishiguro et al. |
| 7,272,230 B2 | 9/2007 | Sasaki |
| 7,346,774 B2 | 3/2008 | Douceur et al. |
| 7,352,867 B2 | 4/2008 | Medvinsky |
| 7,503,073 B2 | 3/2009 | Kawamoto et al. |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0064283 A1 | 5/2002 | Parenty |
| 2002/0065911 A1 | 5/2002 | von Klopp et al. |
| 2002/0065912 A1 | 5/2002 | Catchpole et al. |
| 2002/0080969 A1 | 6/2002 | Giobbi |
| 2002/0126850 A1 | 9/2002 | Allen et al. |
| 2002/0128925 A1 | 9/2002 | Angeles |

| | | | |
|---|---|---|---|
| 2002/0143925 | A1 | 10/2002 | Pricer et al. |
| 2002/0144116 | A1* | 10/2002 | Giobbi .................. 713/168 |
| 2002/0165954 | A1 | 11/2002 | Eshghi et al. |
| 2002/0194492 | A1 | 12/2002 | Choi et al. |
| 2003/0016826 | A1 | 1/2003 | Asano et al. |
| 2003/0055883 | A1 | 3/2003 | Wiles et al. |
| 2003/0079020 | A1 | 4/2003 | Gourraud et al. |
| 2003/0084290 | A1* | 5/2003 | Murty et al. .................. 713/168 |
| 2003/0144900 | A1 | 7/2003 | Whitmer |
| 2003/0154240 | A1 | 8/2003 | Nygren et al. |
| 2004/0010468 | A1 | 1/2004 | Abe et al. |
| 2004/0100507 | A1 | 5/2004 | Hayner et al. |
| 2004/0165717 | A1 | 8/2004 | McIlwaine et al. |
| 2004/0215661 | A1* | 10/2004 | Zhang et al. ............... 707/104.1 |
| 2005/0050345 | A1* | 3/2005 | Dowdy et al. .................. 713/193 |
| 2005/0138560 | A1 | 6/2005 | Lee et al. |
| 2005/0144459 | A1 | 6/2005 | Qureshi et al. |
| 2005/0190947 | A1 | 9/2005 | Dulac |
| 2005/0213767 | A1 | 9/2005 | Matsukawa et al. |
| 2005/0249350 | A1 | 11/2005 | Kahn et al. |
| 2005/0271211 | A1 | 12/2005 | Takemura |
| 2006/0026425 | A1 | 2/2006 | Douceur et al. |
| 2006/0158737 | A1* | 7/2006 | Hu et al. ....................... 359/566 |
| 2006/0200415 | A1 | 9/2006 | Lu |
| 2006/0206945 | A1 | 9/2006 | Kato et al. |
| 2006/0242069 | A1 | 10/2006 | Peterka et al. |
| 2007/0036283 | A1 | 2/2007 | Shaffer et al. |
| 2007/0174067 | A1 | 7/2007 | Ito et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO98/43380 | 11/1998 |
| WO | WO00/16207 | 3/2000 |

OTHER PUBLICATIONS

DKSystems Integrates QM Perception with OnTrack for Training, Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"Price Waterhouse Coopers Case Study: The Business Challenge," Web page, unverified cover date of 2000.

Abstract, networking: "An Online Webliography," Technical Training pp. 4-5 (Nov./Dec. 1998).

Adams et al., "Our Turn-of-the-Century Trend Watch" Technical Training, pp. 46-47 (Nov./Dec. 1998).

Barron, "The Road to Performance: Three Vignettes," Technical Skills and Training, pp. 12-14 (Jan. 1997).

Bauer, "Technology Tools: Just-in-Time Desktop Training is Quick, Easy, and Affordable," Technical Training, pp. 8-11 (May/Jun. 1998).

Beck et al., "Applications of AI in Education," AMC Crossroads vol. 1:1-13 (Fall 1996), Web page, unverified print date of Apr. 12, 2002.

Benson and Cheney, "Best Practices in Training Delivery," Technical Training pp. 14-17 (Oct. 1996).

Bental and Cawsey, "Personalized and Adaptive Systems for Medical Consumer Applications," Communications ACM 45(5):62-63 (May 2002).

Witness Systems promotional brochure for eQuality entitled "Building Customer Loyalty Through Business-Driven Recording of Multimedia Interactions in your Contact Center" (2000).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilovsky et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date Apr. 12, 2002, unverified cover date of 1995.

Calvi and De Bra, "Improving the Usability of Hypertext Courseware through Adaptive Linking," ACM, unknown page numbers (1997).

Coffey, "Are Performance Objectives Really Necessary?" Technical Skills and Training pp. 25-27 (Oct. 1995).

Cohen, "Knowledge Management's Killer App," pp. 1-11, Web page, unverified print date of Apr. 12, 2002, unverified cover date of 2001.

Cole-Gomolski, "New ways to manage E-Classes," Computerworld 32(48):4344 (Nov. 30, 1998).

Cross, "Sun Microsystems—the SunTAN Story," Internet Time Group 8 (2001).

Cybulski and Linden, "Teaching Systems Analysis and Design Using Multimedia and Patterns," unknown date, unknown source.

De Bra et al., "Adaptive Hypermedia: From Systems to Framework," ACM (2000).

De Bra, "Adaptive Educational Hypermedia on the Web," Communications ACM 45(5):60-61 (May 2002).

Dennis and Gruner, "Computer Managed Instruction at Arthur Andersen & Company: A Status Report," Educational Technical, pp. 7-16 (Mar. 1992).

Diessel et al., "Individualized Course Generation: A Marriage Between CAL and ICAL," Computers Educational 22(1/2) 57-64 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," Personal Learning Network pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

e-Learning the future of learning, THINQ Limited, London, Version 1.0 (2000).

Eline, "A Trainer's Guide to Skill Building," Technical Training pp. 34-41 (Sep./Oct. 1998).

Eline, "Case Study: Bridging the Gap in Canada's IT Skills," Technical Skills and Training pp. 23-25 (Jul. 1997).

Eline, "Case Study: IBT's Place in the Sun," Technical Training pp. 12-17 (Aug./Sep. 1997).

Fritz, "CB templates for productivity: Authoring system templates for trainers," Emedia Professional 10(8):6876 (Aug. 1997).

Fritz, "ToolBook II: Asymetrix's updated authoring software tackles the Web," Emedia Professional 10(2):102106 (Feb. 1997).

Gibson et al., "A Comparative Analysis of Web-Based Testing and Evaluation Systems," pp. 1-8, Web page, unverified print date of Apr. 11, 2002.

Hallberg and DeFiore, "Curving Toward Performance: Following a Hierarchy of Steps Toward a Performance Orientation," Technical Skills and Training pp. 9-11 (Jan. 1997).

Harsha, "Online Training "Sprints" Ahead," Technical Training pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," Technical Skills and Training pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Koonce, "Where Technology and Training Meet," Technical Training pp. 10-15 (Nov./Dec. 1998).

Kursh, "Going the distance with Web-based training," Training and Development 52(3):5053 (Mar. 1998).

Larson, "Enhancing Performance Through Customized Online Learning Support," Technical Skills and Training pp. 25-27 (May/Jun. 1997).

Linton et al., "OWL: A Recommender System for Organization-Wide Learning," Educational Technical Society 3 (1):62-76 (2000).
Lucadamo and Cheney, "Best Practices in Technical Training," Technical Training pp. 21-26 (Oct. 1997).
McNamara, "Monitoring Solutions: Quality Must Be Seen and Heard," Inbound/Outbound pp. 66-67 (Dec. 1989).
Merrill, "The New Component Design Theory: Instruction design for courseware authoring," Instructional Science 16:19-34 (1987).
Kane, AOL-Tivo: You've Got Interactive TV, ZDNN, Aug. 17, 1999.
Kay, "E-Mail in Your Kitchen", PC World Online, Mar. 28, 1996.
Kenny, "TV Meets Internet", PC World Online, Mar. 28, 1996.
Linderholm, "Avatar Debuts Home Theater PC", PC World Online, Dec. 1, 1999.
Mendoza, "Order Pizza While You Watch", ABCNews.com.
Moody, "WebTV: What the Big Deal?", ABCNews.com.
Murdorf et al., "Interactive Television—Is There Life After the Internet?", Interactive TV News.
Needle, "PC, TV or Both?", PC World Online.
Interview with Steve Perlman, CEO of Web-TV Networks, PC World Online.
Press, Two Cultures, The Internet and Interactive TV, Universite de Montreal.
Reuters, "Will TV Take Over Your PC?", PC World Online.
Rohde, "Gates Touts Interactive TV", InfoWorld, Oct. 14, 1999.
Ross, "Broadcasters Use TV Signals to Send Data", PC World, Oct. 1996.
Schlisserman, "Is Web TV a Lethal Weapon?", PC World Online.
Stewart, "Interactive Television at Home: Television Meets the Internet", Aug. 1998.
Swedlow, "Computer TV Shows: Ready for Prime Time?", PC World Online.
Wilson, "U.S. West Revisits Interactive TV", Interactive Week, Nov. 28, 1999.
Klein, "Command Decision Training Support Technology," Web page, unverified print date of Apr. 12, 2002.
Notification of Transmittal of the International Search Report and the Written Opinion of the International Searching Authority, dated Apr. 24, 2008.
Notification Concerning Transmittal of International Preliminary Report on Patentability and Written Opinion of the International Searching Authority, dated Apr. 9, 2009.
Qiong Liu et al., Digital Rights Management for Content Distribution, pp. 1-10, Australian Computer Society, 2003.
Ethan Miller et al., Strong Security for Distributed File Systems, pp. 34-40, IEEE, 2001.
Minton-Eversole, "IBT Training Truths Behind the Hype," Technical Skills and Training pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" American Association for Artificial Intelligence, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of End-User Training Needs," Communications ACM 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," Technical Training pp. 10-13 (Jul./Aug. 1998).
Pamphlet, "On Evaluating Educational Innovations," authored by Alan Lesgold, unverified cover date of Mar. 5, 1998.
Papa et al., "A Differential Diagnostic Skills Assessment and Tutorial Tool," Computer Education 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark Web product," Web page, unverified print date of Apr. 1, 2002.

Phaup, "QM Perception Links with Integrity Training's WBT Manager to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.
Piskurich, "Now-You-See-'Em, Now-You-Don't Learning Centers," Technical Training pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," Technical Skills and Training pp. 6-8 (May/Jun. 1995).
Stormes, "Case Study: Restructuring Technical Training Using ISD," Technical Skills and Training pp. 23-26 (Feb./Mar. 1997).
Tennyson, "Artificial Intelligence Methods in Computer-Based Instructional Design," Journal of Instruction Development 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," ACM pp. 194-198 (1997).
Uiterwijk et al., "The virtual classroom," InfoWorld 20(47):6467 (Nov. 23, 1998).
Unknown Author, "Long-distance learning," InfoWorld 20(36):7276 (1998).
Untitled, 10th Mediterranean Electrotechnical Conference vol. 1 pp. 124-126 (2000).
Watson and Belland, "Use of Learner Data in Selecting Instructional Content for Continuing Education," Journal of Instructional Development 8(4):29-33 (1985).
Weinschenk, "Performance Specifications as Change Agents," Technical Training pp. 12-15 (Oct. 1997).
Witness Systems promotional brochure for eQuality entitled "Bringing eQuality to eBusiness."
Aspect Call Center Product Specification, "Release 2.0", Aspect Telecommunications Corporation, May 23, 1998, 798.
Metheus X Window Record and Playback, XRP Features and Benefits, 2 pages, Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, "Everything You Ever Wanted to Know About Cryptography Legislation . . . (But Were too Sensible to Ask)", PC World Online, Dec. 14, 1999.
Berst, "It's Baa-aack. How Interactive TV is Sneaking Into Your Living Room", The AnchorDesk, May 10, 1999.
Berst, "Why Interactive TV Won't Turn You on (Yet)", The AnchorDesk, Jul. 13, 1999.
Borland and Davis, "US West Plans Web Services on TV", CNETNews.com, Nov. 22, 1999.
Brown, "Let PC Technology Be Your TV Guide", PC Magazine, Jun. 7, 1999.
Brown, "Interactive TV: The Sequel", NewMedia, Feb. 10, 1998.
Cline, "Deja vu—Will Interactive TV Make It This Time Around?", DevHead, Jul. 9, 1999.
Crouch, "TV Channels on the Web", PC World, Sep. 15, 1999.
D'Amico, "Interactive TV Gets $99 set-top box", IDG.net, Oct. 6, 1999.
Davis, "Satellite Systems Gear Up for Interactive TV Fight", CNETNews.com, Sep. 30, 1999.
Diederich, "Web TV Data Gathering Raises Privacy Concerns", ComputerWorld, Oct. 13, 1998.

Digital Broadcasting, Interactive TV News.

EchoStar, "MediaX Mix Interactive Multimedia With Interactive Television", PRNews Wire, Jan. 11, 1999.

Furger, "The Internet Meets the Couch Potato", PCWorld, Oct. 1996.

"Hong Kong Comes First with Interactive TV", SCI-TECH, Dec. 4, 1997.

"Interactive TV Overview TimeLine", Interactive TV News.

"Interactive TV Wars Heat Up", Industry Standard.

Needle, "Will the Net Kill Network TV?" PC World Online, Mar. 10, 1999.

* cited by examiner

301

| 310 | 315 |
|---|---|
| ELECTRONIC KEY 1101 | UNIQUE IDENTIFIER 0202 |
| ELECTRONIC KEY 0102 | UNIQUE IDENTIFIER 2202 |
| ELECTRONIC KEY 0033 | UNIQUE IDENTIFIER 0103<br>UNIQUE IDENTIFIER 0106 |
| ... | ... |
| ELECTRONIC KEY YYYY | UNIQUE IDENTIFIER ZZZZ |

| 405 | 410 |
|---|---|
| KEY ID 0001 | DATA 1101 |
| KEY ID 1003 | DATA 0102 |
| KEY ID 0103 | DATA 0033 |
| ... | ... |
| KEY ID XXXX | DATA YYYY |

401

| 410 | 415 |
|---|---|
| METADATA 3302 | KEY ID 0001 |
| METADATA 3003 | KEY ID 0003 |
| METADATA 3003 | KEY ID 0003 |
| ... | ... |
| METADATA AAAA | KEY ID XXXX |

FIG. 4

SYSTEMS AND METHODS FOR A SECURE RECORDING ENVIRONMENT

CROSS-REFERENCE TO RELATED APPLICATION

The present application is a continuation of U.S. patent application Ser. No. 11/479,926, entitled "SYSTEMS AND METHODS FOR A SECURE RECORDING ENVIRONMENT," filed on Jun. 30, 2006, which is hereby incorporated by reference in its entirety.

TECHNICAL FIELD

The present disclosure is generally related to methods and systems that provide secure, captured data in a customer center.

BACKGROUND

Security is fast becoming a primary concern as private information is communicated during interactions between a customer and a business, particularly at a customer center. Some interactions are captured and stored in a recording system for evaluation of an agent and visualization of performance of the customer center, for example. Some captured interactions have private information such as credit card information, social security number, and date of birth. Clearly, this type of information could be subject to identity theft and unlawful access.

SUMMARY

Systems and methods are disclosed for providing secure, captured data in a customer center. In one embodiment, the method comprises: capturing data with a recording system; receiving a request to retrieve electronic keys for encrypting the data; responsive to receiving the request, transmitting the electronic keys to the recording system; encrypting the data using the electronic keys; associating the electronic keys with the encrypted data; and storing the encrypted data in the recording system.

Systems and methods are disclosed for retrieving and playing back a secure, captured data in a customer center. In another embodiment, the method comprises: transmitting a request by a retrieval component to retrieve stored, encrypted data from a recording subsystem; establishing a secure communication between the retrieval component and the recording subsystem to retrieve the stored, encrypted data; receiving the stored, encrypted data by the retrieval component; transmitting a request to retrieve electronic keys for decrypting the stored, encrypted data; receiving the electronic keys by the retrieval component; decrypting the stored, encrypted data using the electronic keys; and playing back the decrypted data.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 illustrates an exemplary database of electronic keys.

FIG. 4 illustrates an exemplary database of stored data and metadata associated with the stored data.

DETAILED DESCRIPTION

Disclosed herein are systems and methods for providing secure, captured data in a customer center. Customer center includes, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, and speech analytics, for example. In particular, embodiments of such a system incorporate a key management system, which can be located at the customer center, that provides secure, captured data during collection, recording and transmission of the captured data. The key management system provides electronic keys for encrypting and decrypting data. By encrypting the data, even if a hacker breaks through all other protection mechanisms (e.g., firewalls) and gains access to encrypted data, the hacker is prevented from being able to read the data without further breaking the encryption.

Figure 1:
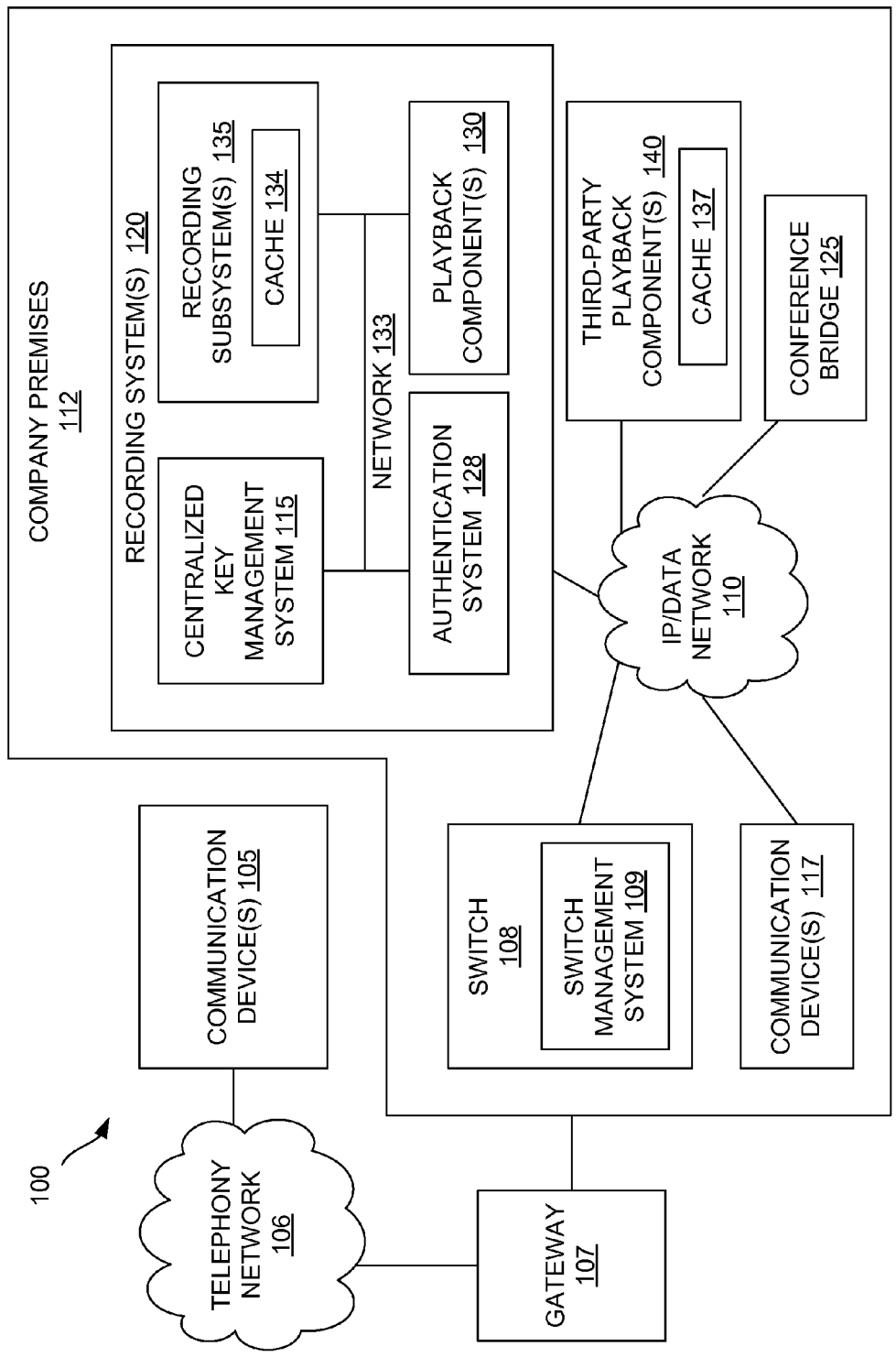
FIG. 1 is a schematic diagram of an embodiment of an encrypted recording environment using a centralized key management system in a company premises.

FIG. 1 is a schematic diagram of an embodiment of an encrypted recording environment 100 using a centralized key management system in a company premises. Communication device 105 is coupled to a telephone network 106, which is coupled to a gateway 107. The gateway 107 is coupled to a company premises 112, particularly to a switch 108. The switch 108 can be a voice over Internet Protocol (VoIP) switch and includes a switch management system 109 that encrypts data from an interaction between, for example, users of communication device 105 and communication device 117 or users of the communication devices 117. The switch management system 109 associates electronic keys with the encrypted data. The switch management system 109 transmits the encrypted data to an IP/data network 110. Additionally or alternatively, the switch 108 can be a time-division multiplexing (TDM) switch, which transmits unencrypted data associated with the interaction.

The communication devices 105, 117 can include, but not limited to, an Internet Protocol (IP) soft phone, a TDM phone, and a computing device. The communication device 117 can communicate with the communication devices 105 or other communication devices 117 via the IP/data network 110 and switch 108. If the communication devices are IP soft phones or computing devices, the communication devices 105, 117 can decrypt incoming data from the switch 108 and transmits outgoing data to the switch 108.

Additionally or alternatively, the communication device 117 can encrypt its outgoing data and transmit the outgoing data to the switch 108. The switch 108 decrypts the outgoing data for the communication device 105. The encryption of the data at the switch 108 and the communication device 117 provides security to the data of the interactions between users of the communication devices 105, 117 or users of the communication device 117 in the company premises 112.

The switch 108 and/or the communication device 117 transmit encrypted or unencrypted data to one or more recording systems 120. The data is related to, but is not limited to, TDM, conferencing, duplicative, and passive, for example. Each recording system 120 includes a centralized key management system 115, one or more recording subsystems, and one or more playback components, all of which are coupled to a network 133. The recording subsystem 135 includes, but is not limited to, an active-recording buffer, an online-network storage, and an archival system, for example. The recording subsystem 135 receives captured data from the switch 108 and/or the communication device 117. The recording subsystem 135 further receives metadata that includes information related to the interaction, such as agent identification and call time, for example. In general, the metadata is transmitted with the data to the recording subsystem 135. In this regard, "data" includes metadata of an interaction along with the captured audio, video, screen capture, and text messaging signals.

If the data are encrypted, the recording subsystem 135 decrypts the data from the switch 108 and/or the communication device 117 using electronic keys from the switch 108 and/or the communication device 117, respectively. Either the recording subsystem 135 decrypts the data or receives unencrypted data, the recording subsystem 135 then transmits a request to the centralized key management system 115 for an electronic key to encrypt the data. The recording subsystem 135 generates a unique identifier, which can be calculated based on a checksum or hash value of the data, for example. The recording subsystem 135 associates the unique identifier with the captured data. The request can include, but not limited to, unique identifiers associated with the captured data and authentication information.

Unique identifiers are codes used to identify the captured data that are unique within a given context. There are three ways, among others, of generating unique identifiers: 1) serial numbers, allocated in sequence, 2) random numbers selected from a number space much larger than the expected number of objects to be identified, and 3) meaningful names or codes allocated by choice which are forced to be unique by keeping a central registry. All of the above methods can be combined hierarchically, singly or in combination with one another, to create scalable schemes for creating unique identifiers. In many cases, the captured data may have more than one unique identifier, each of which identifies it for a different purpose.

Hash value is computed from a base input number using a hashing algorithm. Essentially, the hash value is a summary of the original value. The hash value is nearly impossible to derive the original input number without knowing the data used to create the hash value.

The centralized key management system 115 receives the request from the recording subsystem 135 and determines whether the recording subsystem 135 has authentication via an authentication system 128 to retrieve electronic keys. The centralized key management system 115 generates electronic keys for decrypting and encrypting data. The electronic keys can be used as active keys, inactive keys, and random, semi-random, and sequential rotations of keys. The centralized key management system 115 can generate key identification associated with the generated electronic keys based on a checksum or hash value of the data.

Responsive to the recording subsystem 135 having authentication, the centralized key management system 115 selects an electronic key for encrypting the captured data. The centralized key management system 115 generates a key identification for each electronic key and associates the key identification with the electronic key. Additionally or alternatively, the centralized key management system 115 associates the electronic keys with the unique identifier. The generated keys are maintained until the associated data are removed from the encrypted recording environment 100. The unique identifier can be used to obtain the electronic key from the centralized key management system 115. The structure of the electronic key is described in relation to FIG. 3.

The centralized key management system 115 transmits the electronic keys to the recording subsystem 135. The recording subsystem 135 receives the electronic keys and encrypts the captured data using the electronic keys. Alternatively or additionally, the recording subsystem 135 can associate the key identification with the encrypted data. The key identification can be used to obtain the electronic key from the centralized key management system 115. The encrypted data are stored in the recording subsystem 135. Additionally or alternatively, the recording subsystem includes 135 a database of metadata and key identifications. The recording subsystem 135 uses the metadata to retrieve the stored, encrypted data. The metadata is associated with the key identifications, which the recording subsystem 135 uses to retrieve the electronic keys from the centralized key management system 115. The structures of the encrypted data and metadata are described in relation to FIG. 4.

Additionally or alternatively, the centralized key management system 115 can transmit the electronic keys maintained in the centralized key management system 115 to a cache 134 located in the recording subsystem 135. The cache 134 is a secure non-volatile component. The cache 134 can store active keys and inactive keys. The keys stored in the cache 134 can be updated via the centralized key management system 115. The cache 134 can be receive a request for the electronic key from a retrieval system, such as the recording subsystem 135, the playback component 130, or a third party playback component 140. The request includes a unique identifier associated with the data and/or key identification associated with the electronic key. The cache 134 uses the unique identifier and/or key identification to provide the electronic keys to the retrieval system. The cache 134 transmits the electronic key via the network 133 and/or IP/data network 110. The encryption of the data by the recording subsystem 135 provides security during the transmission and storage of the data in the recording system 120. The retrieval process of the electronic keys allows the encrypted data to migrate to different retrieval systems using the associated electronic keys for decrypting the data.

There are various encryption methods. For example, in symmetric-key encryption, each computer has a secret key (code) that the computer use to encrypt a packet of information before the packet is sent over the network to another computer. Symmetric-keys are installed into computers that communicate with each other. Symmetric-key encryption is essentially the same as a secret code that each computer knows to decode the information. The code provides the key for decoding the message. An analogy of the encryption is that a first person creates a coded message and sends the message to a second person. To decrypt the message, each letter is substituted with the letter that is two down from it in the alphabet. So "A" becomes "C," and "B" becomes "D". The second person knows the encryption method that the code is "Shift by 2". The second person receives the message and decodes it. Anyone else who sees the message will see only nonsense.

Another encryption method is public-key encryption that uses a combination of a private key and a public key. Each private key is assigned to a first computer, while the public key is given by the first computer to any other computers that wants to communicate securely with the first computer. To decode an encrypted message, the other computers use the public key, provided by the first computer, and their own private keys. One public-key encryption utility is called Pretty Good Privacy (PGP).

Public-key encryption takes a lot of computing, so many systems use a combination of public-key and symmetry-key encryption. When two computers initiate a secure session, one computer creates a symmetric key and sends it to the other computer using public-key encryption. The two computers can then communicate using symmetric-key encryption. Once the session is finished, each computer discards the symmetric key used for that session. Any additional sessions require that a new symmetric key be created, and the process is repeated.

Additionally or alternatively, the recording system 120 encrypts incoming and outgoing data from multiple respective communication devices 117 associated with multiple respective interactions. Additionally or alternatively, the recording system 120 can instruct the communication device 117 to transmit incoming and outgoing data to a conference bridge 125. Responsive to receiving the instruction, the communication device 117 transmits incoming and outgoing data to the conference bridge 125, which duplicates and transmits the data to the recording system 120. In other words, the recording system 120 "observes" the calls/extensions of the interactions via the conference bridge to get a copy of the data. The conference bridge 125 can "camp" on a specific extension if the switch 108 permits and receive the data from the communication device 117 for the interactions as long as the recording system 120 is observing the extension.

Additionally or alternatively, the recording system 120 communicating with a VoIP switch 108 can also get the decryption information for active VoIP streams, which can be used for real-time or post call decryption of the data. Additionally or alternatively, the centralized key management system 115 continues to use associated electronic keys from the switch management system 109 for the transmission and storage of the data in the recording system 120. However, the manufacturer of the switch management system 109 currently discourages the use of this security method because this increases the risk of hackers cracking their security through the centralized key management system 115. Hackers (external and internal to a company) can use vendor default passwords and other vendor default settings to compromise systems. These passwords and settings can be easily discovered in hacker communities and easily determined via public information.

The playback component 130, a third-party playback component 140, or another recording subsystem 135 can retrieve the stored data from the recording subsystem 135. The retrieval components 130, 135, 140 can be, for example, a desktop computer that plays and/or displays audio, video, screen capture, and text messaging data on the speaker and monitor, respectively. Responsive to receiving a request from the retrieval components, an authorization process may be required for the retrieval components 130, 135, 140 before communicating with each other. For example, the recording subsystem 135 determines whether the retrieval components 130, 135, 140 have authentication via the authentication system 128 to receive the requested data. If the retrieval components 130, 135, 140 have authentication, the recording subsystem 135 transmits the stored data to the retrieval components 130, 135, 140. If the retrieval components 130, 140 play back the stored data, the retrieval components 130, 140 can retrieve the electronic keys from the centralized key management system 115 and/or cache 134, 137 using key identification associated with the encrypted data or the unique identifier of the encrypted data that is associated with the electronic key. The retrieval components 130, 140 decrypt the requested data using the associated electronic key and play back the requested data.

Additionally or alternatively, a secure tunnel may be established among the retrieval components before stored data and electronic keys are transmitted and received among the retrieval components. For example, a secure sockets layer (SSL) is a cryptographic protocol which provide secure communications on the network (e.g., Internet) for data, such things as e-mail and internet faxing. The SSL protocol exchanges data. Each data can be optionally compressed, encrypted and packed with a message authentication code (MAC). Each data can have a content_type field that specifies which upper level protocol is being used. When the retrieval components 130, 140 connect with the recording subsystem 135 connection, the data level encapsulates another protocol, the handshake protocol, which has the content_type.

Several handshake structures are transmitted and received via the network.

For example, a ClientHello message is transmitted specifying the list of cipher suites, compression methods and the highest protocol version being supported. Random bytes can be transmitted. A ServerHello message is received, in which the server chooses the connection parameters from the choices offered by the client earlier. When the connection parameters are known, the retrieval components 130, 135, 140 exchange certificates (depending on the selected public key cipher). These certificates are currently X.509, which is an international Telecommunication union (ITU) standard. The retrieval components 130, 135, 140 can request a certificate from another retrieval component so that the connection can be mutually authenticated. the retrieval components 130, 135, 140 negotiate a common secret called "master secret", possibly using the result of a Diffie-Hellman exchange, or simply encrypting a secret with a public key that is decrypted with the peer's private key. All other key data is derived from this "master secret" (and the client- and server-generated random values), which is passed through a "Pseudo Random Function". Once the retrieval components 130, 135, 140 have authentication, the stored data are secure to be passed among the retrieval components 130, 135, 140.

Additionally or alternatively, the recording subsystem 135 transmits the requested data to the centralized key management system 115 for decryption and instructs the system 115 to transmit the decrypted data to the playback components 130, 140. Additionally or alternatively, the recording subsystem uses the key identification associated with the encrypted data to obtain the electronic key from the cache 134 and transmits the requested data along with the associated electronic key to the retrieval components 130, 135, 140. Additionally or alternatively, the recording subsystem uses the key identification associated with the encrypted data to obtain the electronic key from the cache 134 and transmits the requested data along with the associated electronic key to the retrieval components 130, 135, 140. In the various alternative embodiments mentioned above, the transmission of the data to the playback component 130 from the recording system 120 are secure by providing encrypted data via a secure tunnel or an authentication process.

Figure 2:
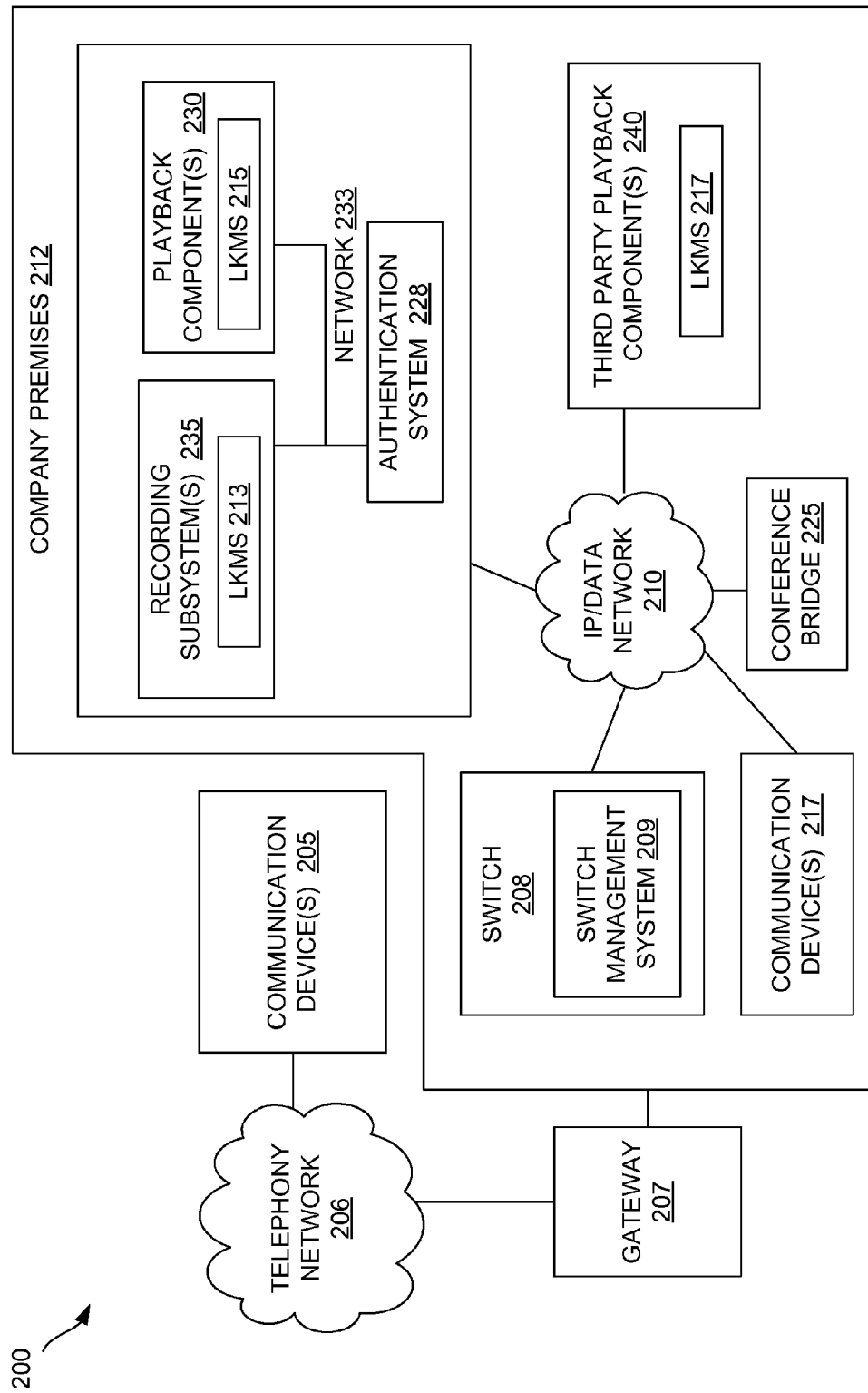
FIG. 2 is a schematic diagram of an embodiment of an encrypted recording environment using a local key management system of a recording system.

FIG. 2 is a schematic diagram of an embodiment of an encrypted recording environment using a local key management system of a recording system. The encrypted recording environment 200 is similar to the encrypted recording environment 100 in FIG. 1 as described above. That is, system 200 includes communication devices 205, 217, telephony network 206, gateway 207, switch 208, switch management system 209, a company premises 212, IP/data network 210, recording system 220, playback component 230, third-party playback component 240, and authentication system 228.

The company premises 212 receives encrypted or unencrypted data from the switch 208 and/or the communication device 217. The received data are transmitted to the recording subsystem 235, which includes a local key management system (LKMS) 213. Similar to the centralized key management system 115 of FIG. 1, the LKMS 213 provides electronic keys for encrypting the received data. The recording subsystem 235 encrypts the received data using the electronic keys and stores the encrypted data. The LKMS 213 can transmit a duplicate copy of the electronic keys to LKMS 215 and LKMS 217 located in the playback component 230 and third-party playback component 240 via the network 233 and IP/data network 210, respectively. The playback components 230, 240 can transmit a request for the electronic keys to the LKMSs 215, 217 to decrypt the encrypted data.

For example, the recording subsystem 235 encrypts and stores data from the company premises 212 using an electronic key from the LKMS 213. The LKMS 213 communicates with the LKMSs 215, 217 via a secure method. The playback components 230, 240 can retrieve the stored, encrypted data from the recording subsystem 235. In addition, the playback components 230, 240 can retrieve the associated electronic key from the LKMSs 215, 217, respectively, using associated key identifications and/or unique identifiers.

FIG. 3 illustrates an exemplary database of electronic keys. The key management system or cache stores the database 301 of the electronic keys. Each electronic key 310 has a key identification 305 and is associated with at least one unique identifier 315 of the encrypted data. For example, data with unique identifiers 0103 and 0106 can be encrypted and decrypted using the electronic key 0033. Retrieval components can retrieve the electronic keys using the unique identifier.

FIG. 4 illustrates an exemplary database of stored data and metadata associated with the stored data. The recording subsystem stores the database 401 of the stored data. Each stored data 410 has a key identification 405. The recording subsystem can use the key identification to retrieve the electronic key for decryption. Additionally or alternatively, retrieval components can use metadata to retrieve the stored, encrypted data. The metadata is associated with the key identifications, which the retrieval components use to retrieve the electronic keys from the key management system or cache.

Figure 5:
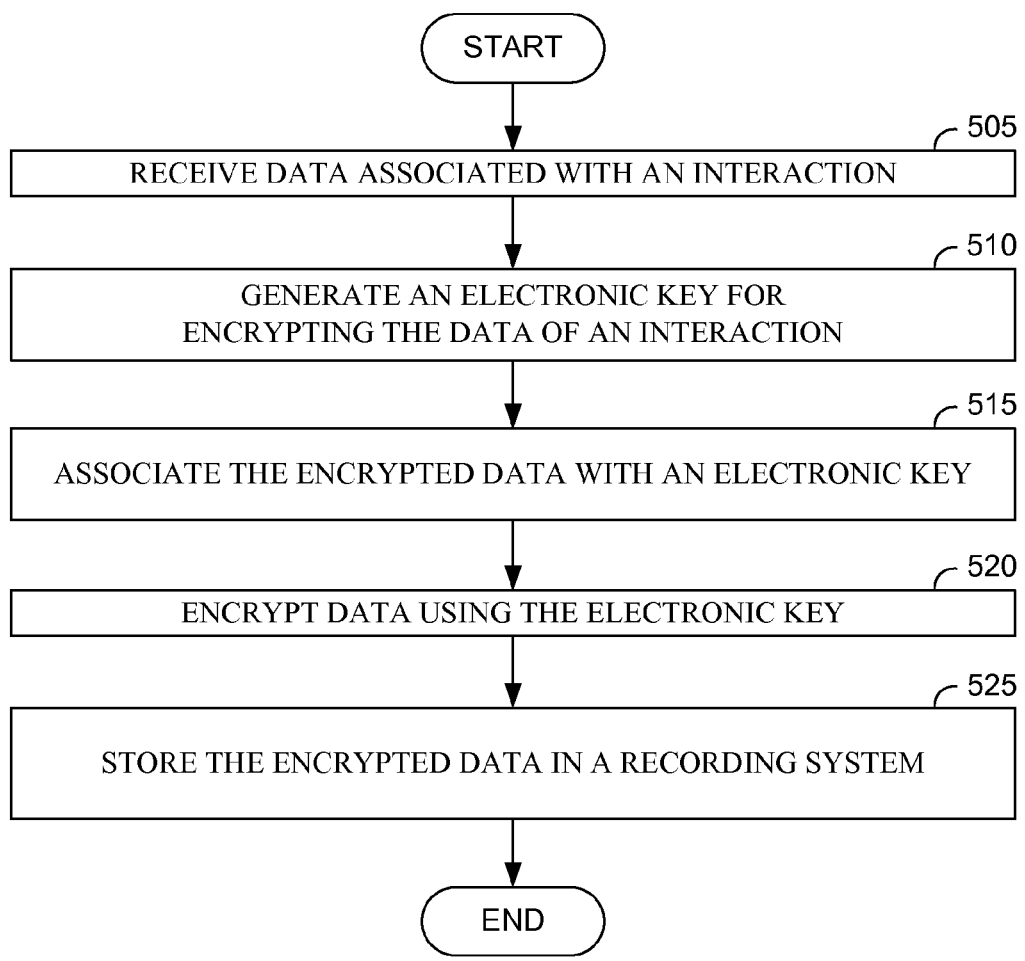
FIG. 5 is a flow diagram that illustrates operation of an embodiment of an encrypted recording environment such as shown in FIGS. 1 and 2.

FIG. 5 is a flow diagram that illustrates operation of an embodiment of an encrypted recording environment such as shown in FIGS. 1 and 2. Beginning with block 505, data associated with an interaction are received, such as at a company premises. In block 510, an electronic key is generated for encrypting the data of the interaction. In block 515, the data are associated with the electronic key. In block 520, the data are encrypted using the electronic key. In block 525, the encrypted data are stored in a recording system.

Figure 6A:
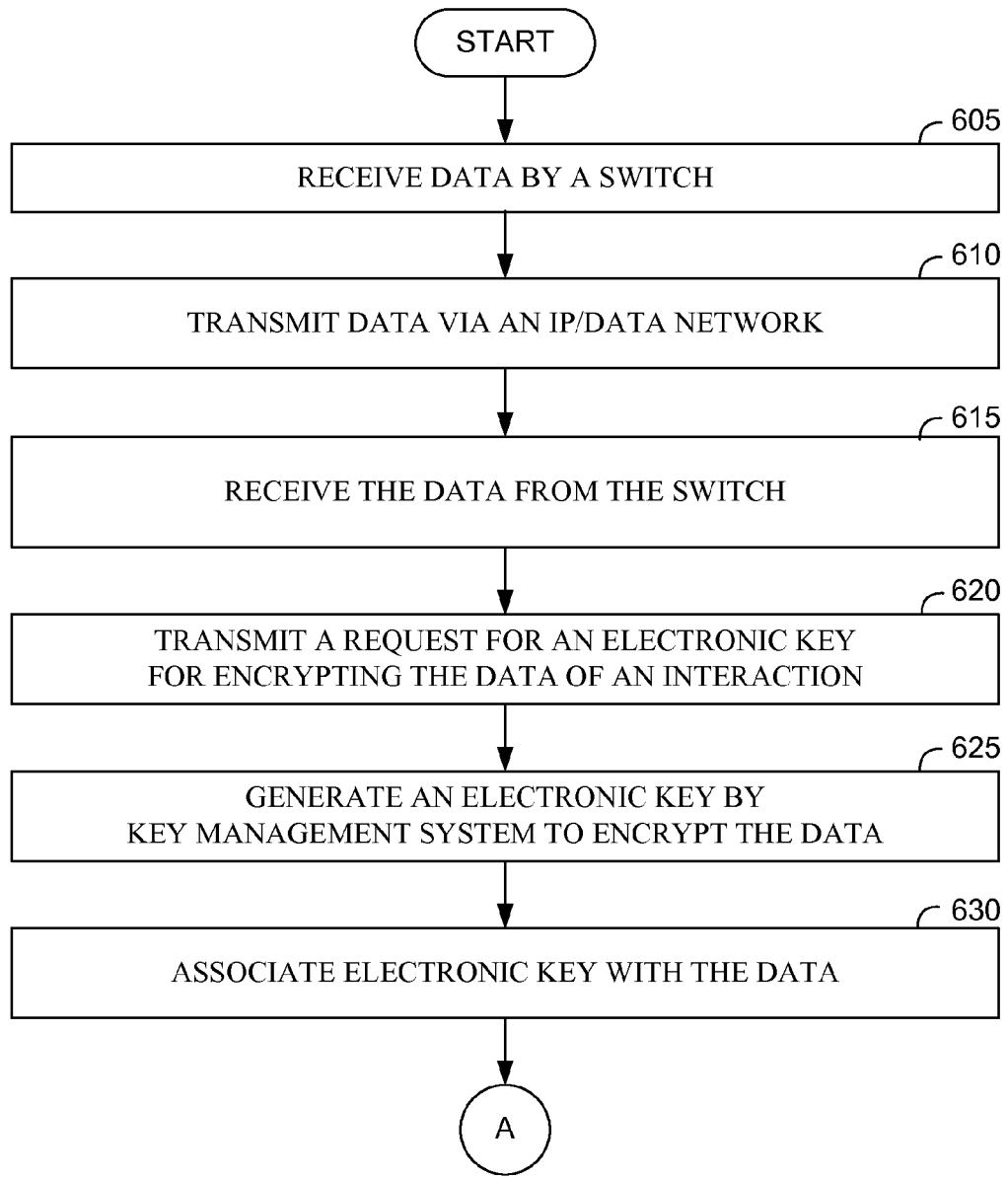
FIGS. 6A-B are flow diagrams that illustrate operation of an embodiment of an encrypted recording system environment, such as shown in FIGS. 1 and 2.
Figure 6B:
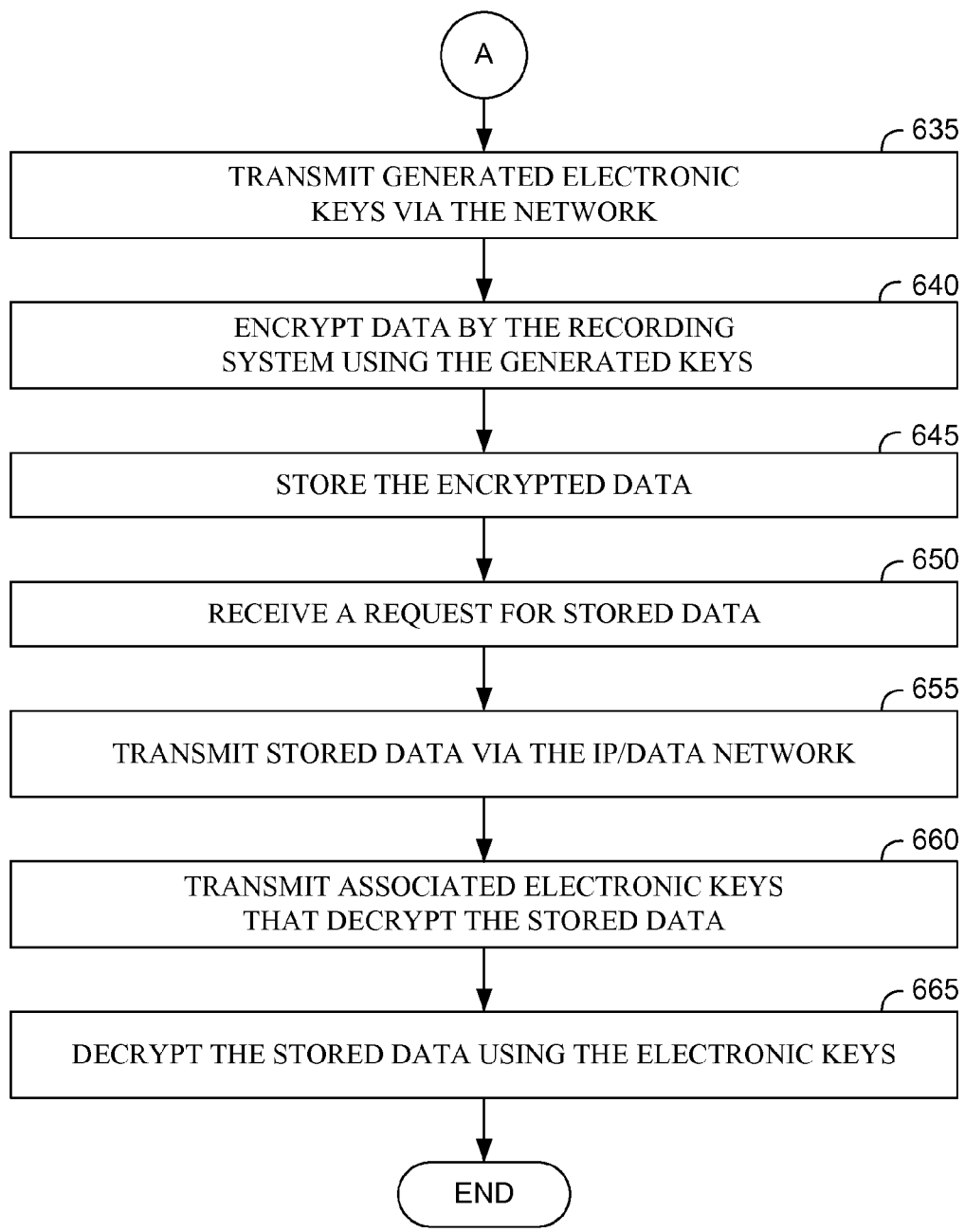

FIGS. 6A-B are flow diagrams that illustrate operation of an embodiment of an encrypted recording system environment, such as shown in FIGS. 1 and 2. In blocks 605 and 610, a switch receives data associated with an interaction and transmits the data via an IP/data network, respectively. In block 615, a recording system receives the data from the switch. In block 620, the recording system transmits a request to a key management system for an electronic key for encrypting the data of an interaction.

In block 625, the key management system generates an electronic key to encrypt the data. In block 630, the key management system associates the electronic key with the data. Alternatively or additionally, the request can be transmitted to a cache that provides an electronic key for encryption of the data. As mentioned above, the cache stores a duplicate copy of at least one electronic keys from the key management system.

In block 635, either the key management system or cache transmits generated electronic keys via a network. In block 640, the recording system encrypts the data using the transmitted keys. In some embodiments, the data are encrypted to include the key identifications of the transmitted keys. In block 645, the recording system stores the encrypted data. In block 650, the recording system receives a request for stored data. The recording system can determine whether a retrieval component has authentication to retrieve the stored data. In block 655, responsive to the determining that the retrieval component has authentication, the recording system transmits the stored data via the network. In block 660, the recording system transmits a request to the key management system or cache to retrieve the associated electronic key for decrypting the stored data. The request for decryption includes the key identification or the unique identifier, or both, which the key management system or cache uses to determine the proper electronic key for decryption of the encrypted data. In block 665, the stored data are decrypted using the electronic keys.

Figure 7:
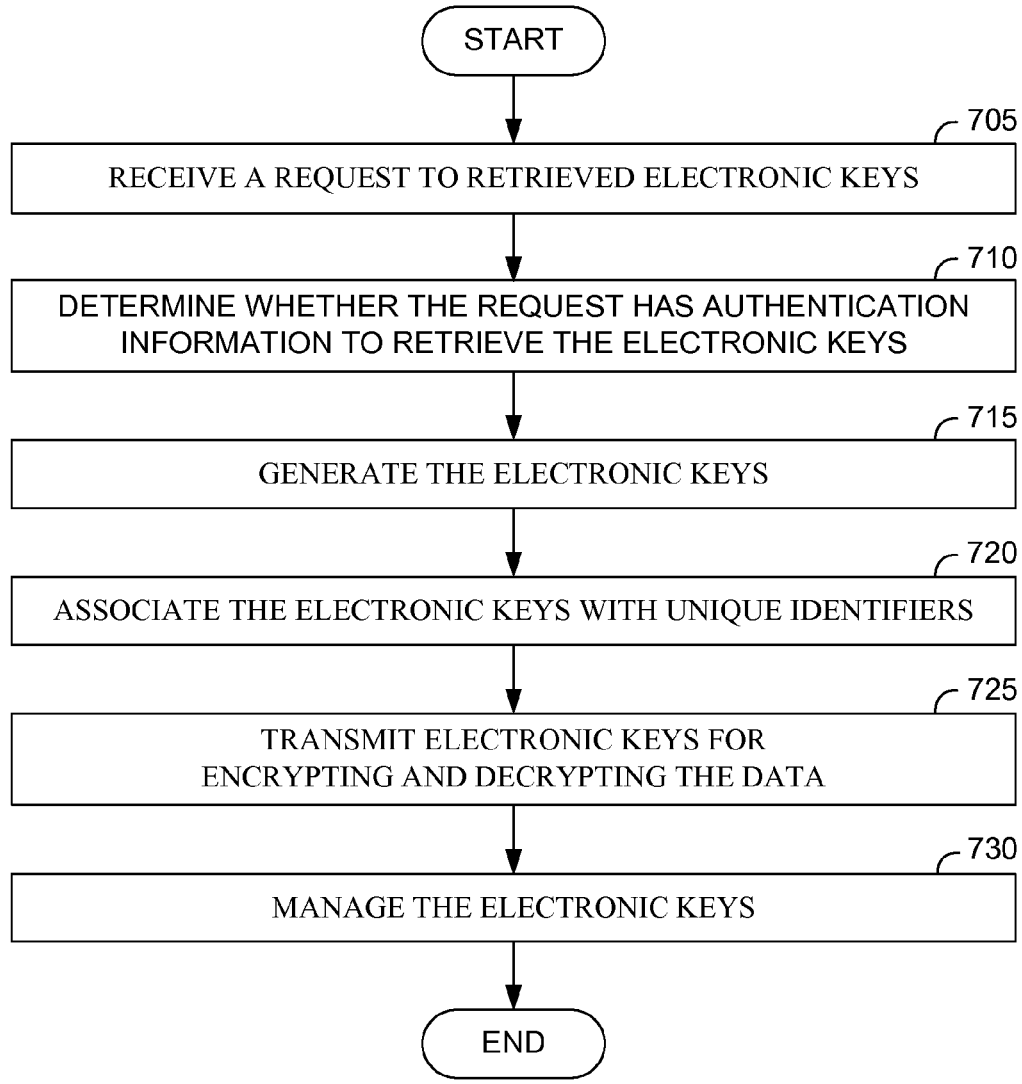
FIG. 7 is a flow diagram that illustrates operation of an embodiment of a key management system.

FIG. 7 is a flow diagram that illustrates operation of an embodiment of a key management system. Beginning with block 705, the key management system receives a request to retrieve electronic keys and in block 710, determines whether the request has authentication information to retrieve the electronic keys. In block 715, responsive to determining that the retrieval component has authentication, the key management system generates the electronic keys. Alternatively or additionally, the key management system can maintain a database of electronic keys and select the electronic keys from the database using random, semi-random, and sequential rotation of the electronic keys. Alternatively or additionally, the keys can be active or inactive keys.

In blocks 720 and 725, the key management system associates the generated or selected electronic keys with unique identifiers of the data and transmits the electronic keys for encrypting and decrypting the data, respectively. Alternatively or additionally, the request can include a key identification that the key management system uses to select the electronic key for decryption of the stored data. In block 730, the key management system manages the electronic keys for at least the life of the associated data.

Figure 8:
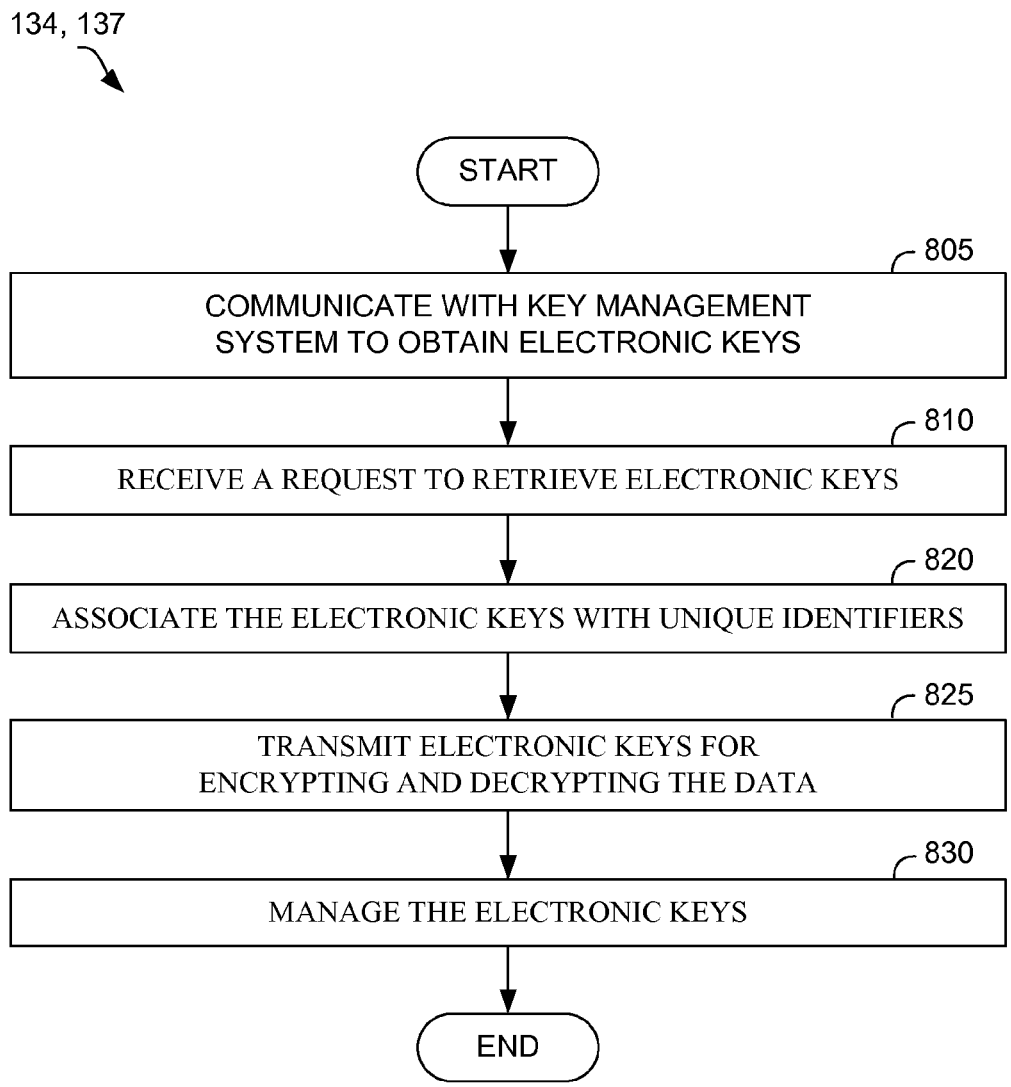
FIG. 8 is a flow diagram that illustrates operation of an embodiment of a cache.

FIG. 8 is a flow diagram that illustrates operation of an embodiment of a cache. In block 805, the cache communicates with a key management system to obtain a duplicate copy of at least one electronic key. In block 810, the cache receives a request to retrieve the electronic keys for encrypting and decrypting data. In block 820, the cache provides an electronic key based on the request. The cache determines whether an electronic key has been associated with the unique identifier. If not, the cache associates an electronic key with the unique identifier, as shown in block 820.

Alternatively or additionally, if a recording subsystem transmits a request for encryption, the cache transmits the electronic key along with the key identification to the retrieval component. The recording subsystem encrypts the data and associates the key identification with the encrypted data. To decrypt the data, the retrieval component can request to the cache for the electronic key that is associated with the key identification and/or the unique identifier. In block 825, the cache transmits the associated electronic keys for encrypting and decrypting the data. In block 830, the cache manages the electronic keys for at least the life of the data.

Figure 9:
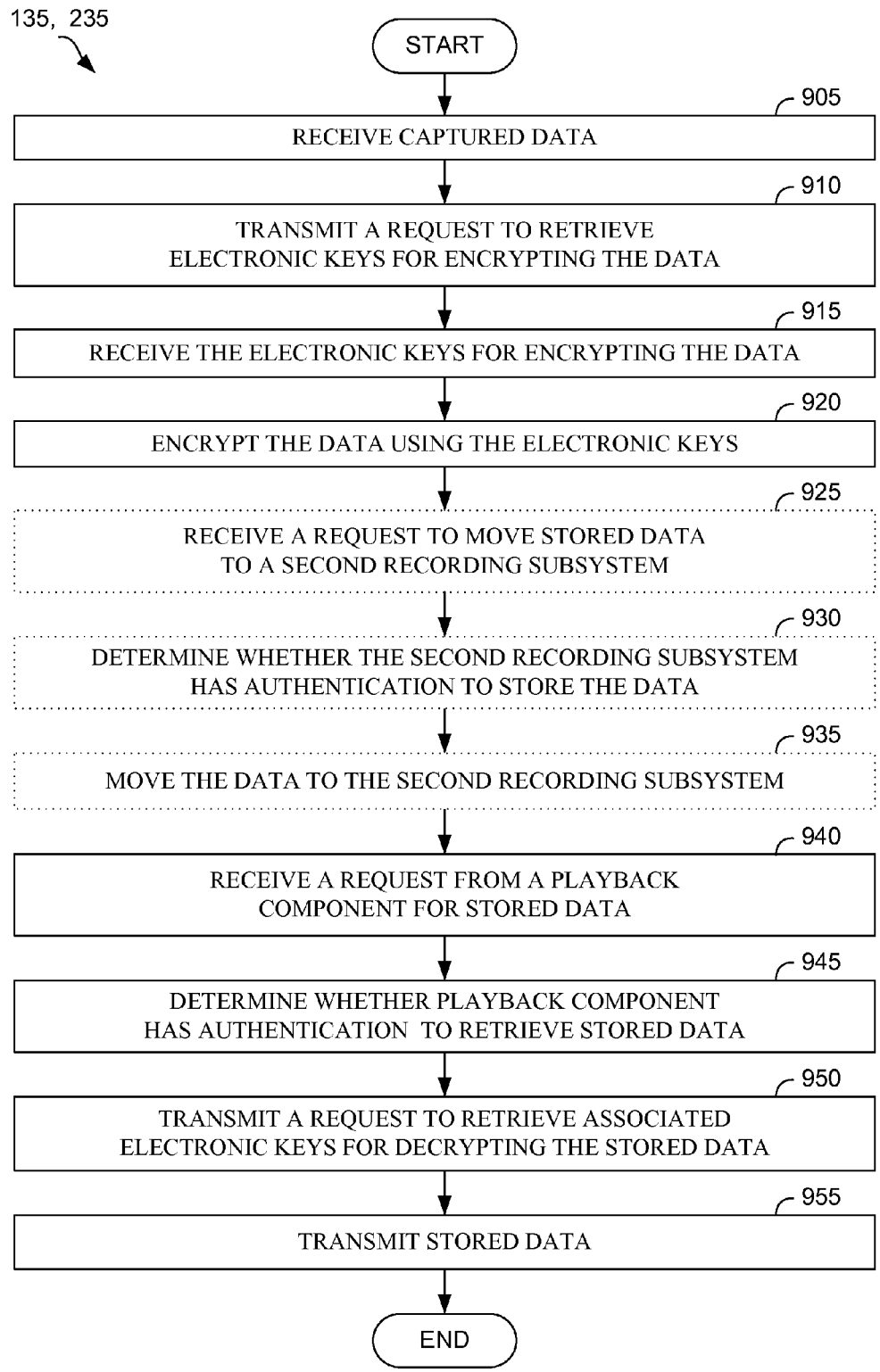
FIG. 9 is a flow diagram that illustrates operation of an embodiment of a recording subsystem.

FIG. 9 is a flow diagram that illustrates operation of an embodiment of a recording subsystem. In block 905, the recording subsystem receives captured data. In block 910, the recording subsystem transmits a request to retrieve electronic keys for encrypting the data. In block 915, the recording subsystem receives the electronic keys for encrypting the data. In block 920, the recording subsystem encrypts the data using the electronic keys.

Alternatively or additionally, in blocks 925 and 930, the recording subsystem receives a request to move stored data to a second recording subsystem and determines whether the second recording subsystem has authentication to store the data, respectively. In block 935, the recording subsystem moves the data to the second recording subsystem.

In block 940, both recording subsystems can receive a request from a playback component for the stored data. In block 945, each recording subsystem determines whether the playback component has authentication to retrieve stored data. In block 950, each recording subsystem transmits a request to a key management system or cache to retrieve associated electronic keys for decrypting the stored data. In blocks 955, each recording subsystem transmits stored data.

Figure 10:
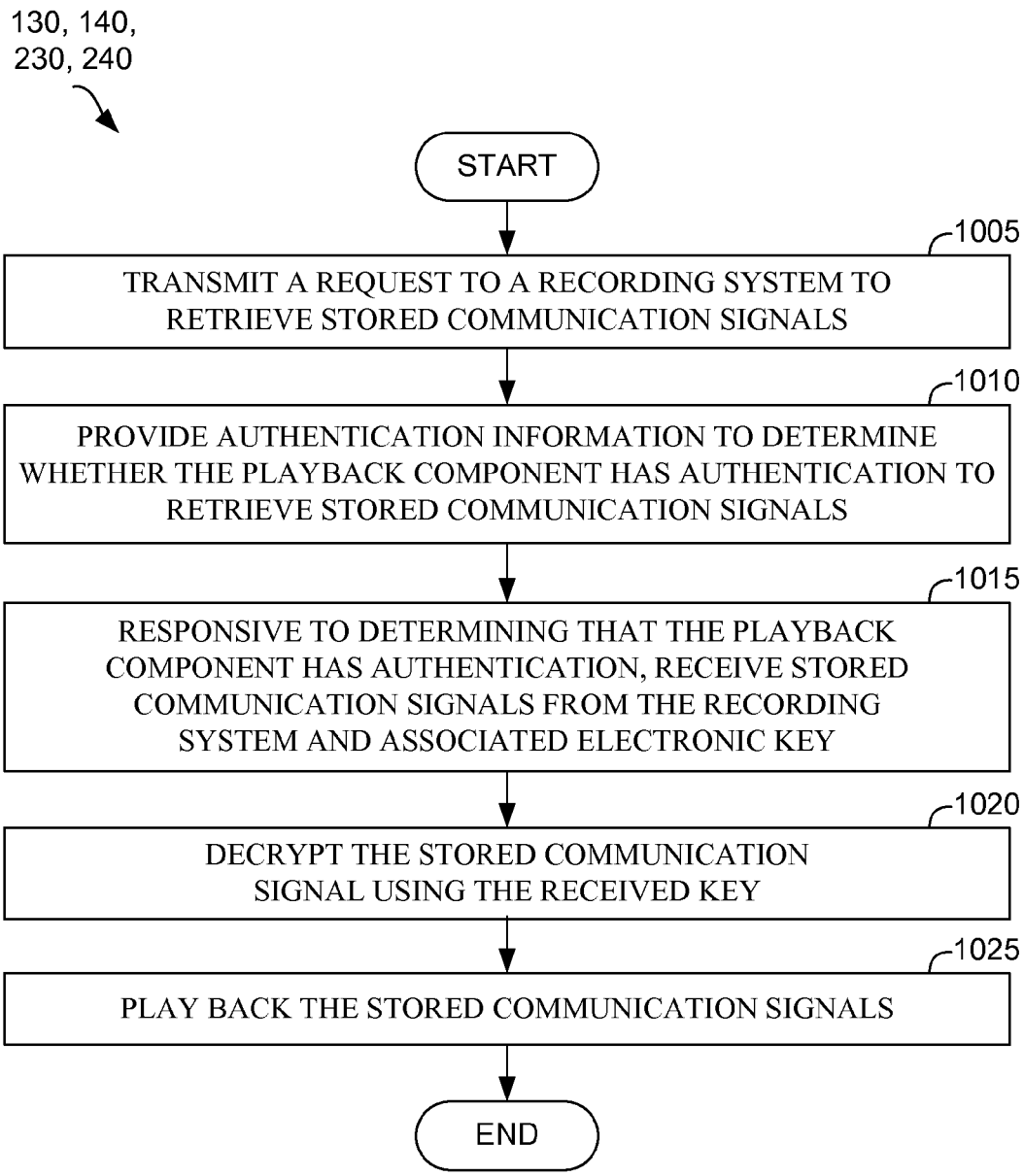
FIG. 10 is a flow diagram that illustrates operation of an embodiment of a playback component.

FIG. 10 is a flow diagram that illustrates operation of an embodiment of a playback component. In blocks 1005 and 1010, the playback component transmits a request to a recording system to retrieve stored data and provides authentication information to determine whether the playback component has authentication to retrieve stored data, respectively. In block 1015, responsive to determining that the playback component has authentication, the playback component receives stored data from the recording system and associates electronic key from a key management system or cache. In block 1020, the stored data are decrypted using the received key. In block 1025, the playback component plays back the stored data.

It should be emphasized that the above-described embodiments are merely possible examples of implementations, merely set forth for a clear understanding of the principles of the invention. Many variations and modifications may be made to the above-described embodiments without departing substantially from the spirit and principles of the invention. All such modifications and variations are intended to be included herein within the scope of this disclosure and the present invention and protected by the following claims.

Therefore, having thus described the invention, at least the following is claimed:

1. A method for providing secure, captured data in a customer center, comprising the steps of:
    capturing unencrypted data with a recording system at a customer center through a VoIP network, wherein the unencrypted data comprises a communication between a user and an agent of the customer center;
    generating, at a key management system, electronic keys for encrypting the unencrypted data;
    transmitting the electronic keys and key identifications to the recording system in response to a request;
    encrypting the unencrypted data at the recording system using the electronic keys to generate encrypted data;
    associating the electronic keys with the encrypted data to store the encrypted data at the recording system;
    associating metadata of the stored encrypted data with the key identifications at the recording system;
    transmitting a code associated with the stored encrypted data to the key management system, the code being unique to a context of the captured unencrypted data; and
    maintaining a database of metadata and key identifications to facilitate retrieval of the electronic keys for decrypting the stored encrypted data.

2. The method as defined in claim 1, wherein associating the electronic keys with the encrypted data comprises associating the key identifications with the stored encrypted data.

3. The method as defined in claim 1, wherein the key identifications are hash values on the electronic keys.

4. The method as defined in claim 1, wherein associating the electronic keys with the encrypted data comprises associating the electronic keys with the code.

5. The method as defined in claim 4, further comprising maintaining a database of electronic keys and unique identifiers to facilitate retrieval of the electronic keys for decrypting the stored encrypted data.

6. The method as defined in claim 1, wherein the code is a hash value based on the electronic keys.

7. A method for providing secure, capture of multimedia communications data in a customer center, comprising the steps of:
    capturing, at a recording system, the multimedia communications data in accordance with predetermined business rules, the multimedia communications data being communicated between a user and an agent of the customer center;
    generating, at a key management system, electronic keys for encrypting the multimedia communications data;
    transmitting the electronic keys and key identifications to the recording system in response to a request;
    encrypting the multimedia communications data at the recording system using the electronic keys to generate and store encrypted data;
    assigning a unique identifier to the multimedia communications data in accordance with a context of the multimedia communications data;
    associating metadata of the stored encrypted data with the key identifications at the recording system; and
    maintaining a database of metadata and key identifications to facilitate retrieval of the electronic keys for decrypting the stored encrypted data.

8. The method as defined in claim 7, wherein associating the electronic keys with the encrypted data comprises associating the key identifications with the stored encrypted data.

9. The method as defined in claim 7, wherein the key identifications are hash values on the electronic keys.

10. The method as defined in claim 7, wherein associating the electronic keys with the encrypted data comprises associating the electronic keys with the unique identifiers.

11. The method as defined in claim 10, further comprising maintaining a database of electronic keys and unique identifiers to facilitate retrieval of the electronic keys for decrypting the stored encrypted data.

12. The method as defined in claim 7, wherein the unique identifiers are hash values on the electronic keys.

* * * * *